(No Model.)
W. BRADLEY.
CONDUIT FOR ELECTRIC RAILWAYS.
No. 455,447. Patented July 7, 1891.
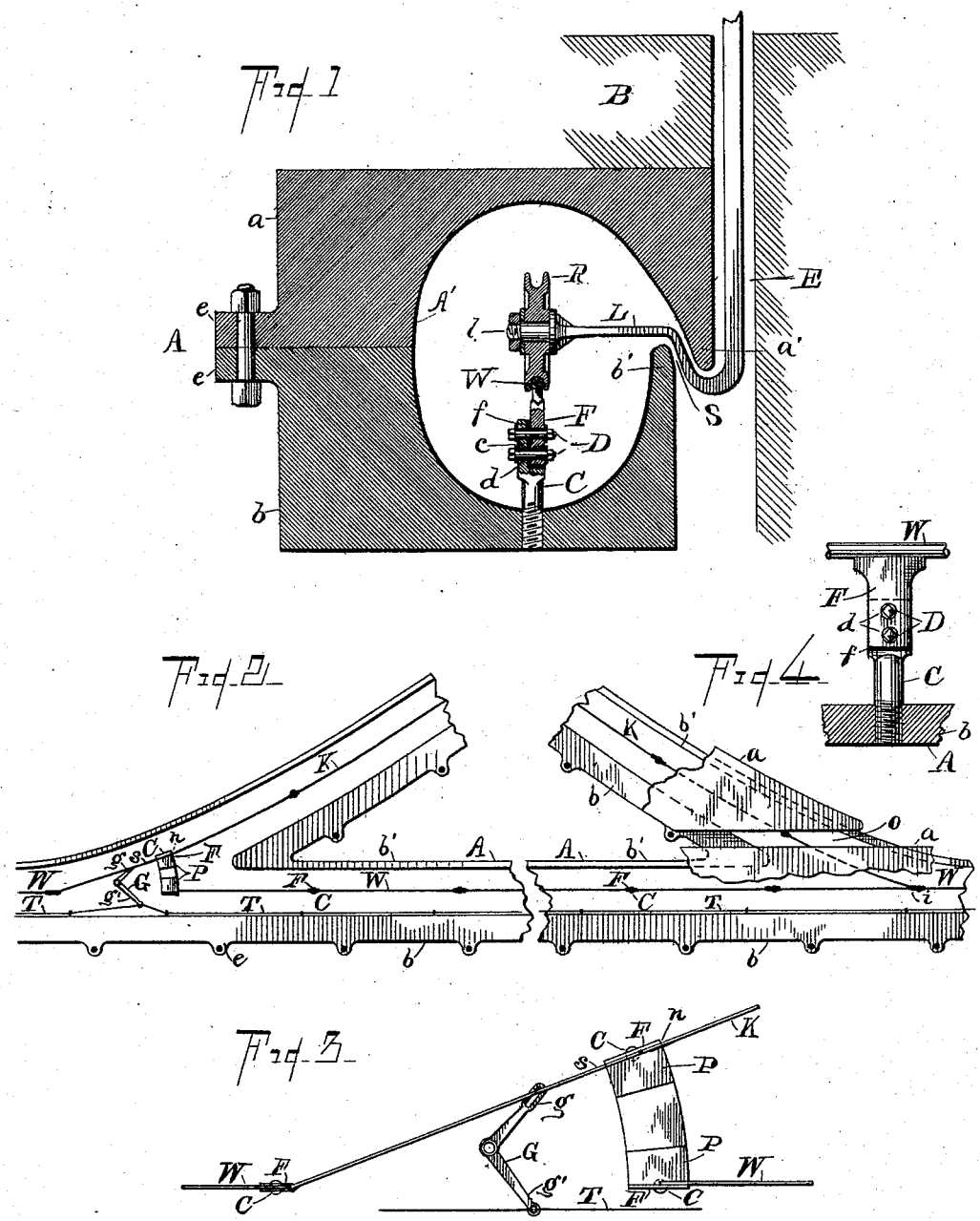
WITNESSES:
William Bradley INVENTOR
By H. C. Hartman
ATTORNEY

UNITED STATES PATENT OFFICE.

WILLIAM BRADLEY, OF FORT WAYNE, INDIANA.

CONDUIT FOR ELECTRIC RAILWAYS.

SPECIFICATION forming part of Letters Patent No. 455,447, dated July 7, 1891.

Application filed November 24, 1890. Serial No. 372,398. (No model.)

*To all whom it may concern:*

Be it known that I, WILLIAM BRADLEY, a citizen of the United States, residing at the city of Fort Wayne, in the county of Allen and State of Indiana, have invented certain new and useful Improvements in Conduits for Electric Railways; and I do hereby declare the following to be a full, clear, and exact description of the invention, such as will enable others skilled in the art to which it appertains to make and use the same.

My invention relates to improvements in conduits for electric railways, and its objects are to provide an improved conduit which shall better prevent the entrance of foreign substances into it and which shall be more convenient in its construction and economical in use, and also to provide an improved switching device in connection therewith. I attain these objects by the mechanism illustrated in the accompanying drawings, in which—

Figure 1 is a vertical section of the conduit with trolley-wheel adjusted on wire. Fig. 2 is a plan view with upper section of box removed, showing the ends of junction of siding to main line, also showing switch. Fig. 3 is a plan view of switch, showing the gate in position to operate siding; and Fig. 4 is a side elevation showing the flange adjusted to the wire and to the standard C.

Similar letters of reference refer to similar parts throughout the views.

My conduit consists of a box or pipe A, constructed in two parts or sections $a$ and $b$, suitably secured to each other, preferably by lugs $e$ and bolts, as shown in Fig. 1. The upper part $a$ of the box projects on one side $a'$ over the lower part $b'$, so as to form a slot S between them to the interior on that side of the box A for the trolley-lever L to pass through into the box and operate freely. I prefer to have the side $a'$ of the upper part extend slightly down below the level of the top of the other side $b'$, because such construction more effectually prevents the entrance of dirt and other substances into the interior of the box A. Within this box A, I attach firmly to its lower part $b$ a standard C to support and hold extended the trolley-wire W. Such attachment is preferably made by forming on the lower end of the standard a screw-bolt and tapping it with the lower part $b$ of the box, as shown in Figs. 1 and 4. I also adapt this standard C so as to support and firmly hold the flange F, which flange is firmly attached to the wire W, preferably by soldering it thereto. A preferable method of attaching the flange F to the standard is shown in Figs. 1 and 4. It consists in cutting out a rabbet $f$ on the upper part of the standard for the flange to rest on and securing the flange by nuts and bolts D. I also place insulating material between the flange F and standard C, and around the bolts D, and insulating-washers $d$ underneath the nuts and heads of the bolts adapted to prevent the current of electricity from passing to the standard C. The flanges F are placed along the wire W at suitable distances apart, being firmly attached to it and supported by the standards.

The trolley-lever L passes down through an aperture E, provided in the materials inclosing the box A, and from thence it is bent so as to pass through the slot S and form a horizontal journal $l$ for the trolley-wheel R to revolve on. The method of conducting the current from the trolley-wire W to the motor by means of the trolley wheel and lever is well known, and therefore the description thereof is omitted.

I also prefer to line the box A with insulating material, as shown by the heavy lines A' in the drawings, such material being placed on the bottom throughout the interior and on the sides next to the aperture E in the inclosing material.

This conduit may be placed between the rails of the railway either above the general surface or with its top even therewith; but I prefer to place it below the surface and to cover it over the top with flagging B, putting mason-work of brick or stone on the side through which the aperture E is made, the whole being adapted to protect the box and preserve the aperture E intact.

I also construct a switching device for transferring the current from the main line to the switch-line as follows: The box A for the switch is varied from a straight line, so as to conform to the curvature of the rails of the switch, Fig. 2, and part of its sides cut away at either end $o$, so as to provide a passage for the trolley-lever L when moving along the main line. At one end of the switch I cut off the main wire W and attach pivotally thereto a switch-joint of wire s. At the other end of the switch i I attach firmly to the main wire W a switch-wire K and carry it around through the switch-box to the other end of the switch n, where it is securely held by flange and standard. A switch-plate P is firmly attached to this end n of the switch-wire K, extending beyond the end and horizontally from it toward the main line W, so as to form a support and connection for the switch-joint s to rest on. This plate P is of conducting material, and on the other side is turned up, so as to form a stop, against which the switch-joint s may be thrown and adapted to hold the switch-joint wire s in place with the switch-wire K, so as to form a continuous line. The end of the main wire W at same end of the switch is provided in like manner with a switch-plate P, the two switch-plates approaching each other, but not sufficiently near to permit the current to pass from one to the other. I preferably connect these plates by an intervening plate of insulating material, thereby preventing any possibility of the switch-joint s dropping between the switch-plates P. The free end of the switch-joint s is moved back and forth over these switch-plates P by a lever G. This lever G is pivoted to the box A. One arm g is provided with means to hold the switch-joint s and permit its free movement, preferably a slot, through which the wire of the switch-joint s passes. The other arm g' is pivoted to an operating-rod T, which extends from one end of the switch to the other, and is then passed up to the surface in any suitable manner, so as to be within easy reach. This lever is thoroughly insulated at all points of contact to prevent a deflection of the current through it to the box or operating-rod T.

The operation of the switch is obvious from the above description. Fig. 2 shows the switch-joint s thrown so as to pass the current along the switch-wire K.

Having thus described my invention, what I claim, and desire to secure by Letters Patent, is—

1. In a conduit for electric railways, the combination of a box or pipe constructed in two sections secured to each other, the projection of the upper part over the lower section adapted to form a slot for the trolley-lever to pass through and be operated, with a standard attached to the interior of the conduit, adapted to support and firmly hold a flange, a trolley-wire provided with flanges rigidly secured thereto, a trolley-lever adapted to pass into the conduit through said slot and provided with a trolley adapted to run on and be confined to the wire, a switch-joint of wire attached pivotally to the main line and having its free end connected to a switch-lever, a switch-lever pivoted to the box, having one arm connected with a switch-joint of wire and the other arm with an operating-rod, switch-plates attached to the main line of wire and to the switch-wire at one end of the switch and adapted to receive the free end of a switch-joint, a switch-wire extending from one end of the switch to the other, attached at one end to the main line of wire and terminating at the other end, adapted to abut with the wire of the switch-joint when it is thrown to the switch, an operating-rod pivoted to one end of the switch-lever and extending to the surface of the roadway, adapted to be operated from either end of the switch, and insulating material adapted to confine the current to the conducting-wires.

2. In a conduit for electric railways, the combination of a box or pipe constructed in two sections secured to each other, a projection of the upper part over the lower section adapted to form a slot for the trolley-lever to pass through and be operated, a standard attached to the interior of the conduit, adapted to support and firmly hold a flange, a trolley-wire provided with flanges rigidly secured thereto, a trolley-lever adapted to pass into the conduit through said slot and provided with a trolley adapted to run on and be confined to the wire, and insulating material adapted to confine the current to the conducting-wires.

3. In a conduit for electric railways, the combination of a box or pipe constructed in two sections secured to each other, a projection of the upper part over the lower section adapted to form a slot for the trolley-lever to pass through and be operated, a standard attached to the interior of the conduit, adapted to support and firmly hold a flange, a trolley-wire provided with flanges rigidly secured thereto, and insulating material adapted to confine the current to the conducting-wires.

4. In a conduit for electric railways, a box or pipe constructed in two sections secured to each other, a projection of the upper part over the lower section adapted to form a slot for the trolley-lever to pass through and be operated.

5. In a switch for the conducting-wires of electric railways, the combination of a switch-joint of wire attached pivotally to the main line, having its free end connected to a switch-lever, a switch-lever pivoted to the conduit, having one arm connected with a switch-joint of wire and the other arm with an operating-rod, switch-plates attached to the main line of wire and to the switch-wire at one end of the switch and adapted to receive the free end of a switch-joint, a switch-wire extending from one end of the switch to the other, attached at one end to the main line of wire and terminating at the other end, adapted to abut with the wire of the switch-joint when it is thrown to the switch, an operating-rod pivoted to one end of the switch-lever and extending to the surface of the roadway, adapted to be operated from either end of the switch, and insulating material adapted to confine the current to the conducting-wires.

6. In a switch for the conducting-wires of electric railways, the combination of a switch-joint of wire attached pivotally to the main line, having its free end connected to a switch-lever, a switch-lever pivoted to the box, having one arm connected with a switch-joint of wire and the other arm with an operating-rod, switch-plates attached to the main line of wire and to the switch-wire at one end of the switch and adapted to receive the free end of a switch-joint, a switch-wire extending from one end of the switch to the other, attached one end to the main line of wire and terminating at the other end, adapted to abut with the wire of the switch-joint when it is thrown to the switch, means to operate the switch-lever, and insulating material adapted to confine the current to the conducting-wires.

In testimony whereof I hereto affix my signature in the presence of two witnesses.

WILLIAM BRADLEY.

Witnesses:
ALBERT BAKER,
H. C. HARTMAN.